(12) United States Patent
Winter

(10) Patent No.: US 8,768,303 B2
(45) Date of Patent: Jul. 1, 2014

(54) TELECOMMUNICATIONS CHIP CARD AND MOBILE TELEPHONE DEVICE

(75) Inventor: Christian Winter, Rheda-Wiedenbruck (DE)

(73) Assignee: Morpho Cards GmbH, Flintbek (DE)

( * ) Notice: Subject to any disclaimer, the term of this patent is extended or adjusted under 35 U.S.C. 154(b) by 77 days.

(21) Appl. No.: 13/108,192

(22) Filed: May 16, 2011

(65) Prior Publication Data

US 2011/0281558 A1 Nov. 17, 2011

(30) Foreign Application Priority Data

May 17, 2010 (EP) .................................. 10163024

(51) Int. Cl.
*H04W 12/06* (2009.01)
*H04W 4/02* (2009.01)
*H04W 12/08* (2009.01)

(52) U.S. Cl.
USPC ..................... 455/411; 455/410; 455/456.1

(58) Field of Classification Search
USPC ..................... 455/411, 410, 456.1
See application file for complete search history.

(56) References Cited

U.S. PATENT DOCUMENTS

| | | | |
|---|---|---|---|
| 7,606,580 B2* | 10/2009 | Granito et al. | 455/456.1 |
| 2001/0055393 A1* | 12/2001 | Sundaravel et al. | 380/258 |
| 2004/0233857 A1* | 11/2004 | Wimmer et al. | 370/254 |
| 2005/0157954 A1* | 7/2005 | Dijk | 382/321 |
| 2006/0258368 A1* | 11/2006 | Granito et al. | 455/456.1 |
| 2007/0184851 A1* | 8/2007 | Barnwell et al. | 455/456.1 |
| 2007/0288480 A1* | 12/2007 | Caplan et al. | 707/10 |
| 2008/0109551 A1* | 5/2008 | Sim et al. | 709/228 |
| 2008/0119160 A1* | 5/2008 | Andriantsiferana et al. | 455/406 |
| 2009/0037326 A1 | 2/2009 | Chitti | |
| 2009/0098825 A1* | 4/2009 | Huomo et al. | 455/41.1 |
| 2011/0199185 A1* | 8/2011 | Karaoguz et al. | 340/8.1 |

FOREIGN PATENT DOCUMENTS

| | | |
|---|---|---|
| EP | 1837781 A1 | 9/2007 |
| EP | 2048591 A1 | 4/2009 |
| WO | WO2009071734 A1 | 6/2009 |

* cited by examiner

*Primary Examiner* — Jinsong Hu
*Assistant Examiner* — Jean Chang
(74) *Attorney, Agent, or Firm* — Dentons US LLP

(57) ABSTRACT

A telecommunications chip card (100) for enabling the login of a mobile telephone device (202) into a digital cellular mobile telecommunications network (200), the telecommunications chip card comprising:

a chip card reader interface (102) adapted for allowing communications between the telecommunications chip card and the mobile telephone device, wherein the chip card reader interface is adapted for receiving physical parameter data (112, 118, 120, 224) via the chip card reader interface;

a processor (104);

a memory (106) for storing applications for execution by the processor;

an application (108) stored in the memory comprising machine readable instructions executable by the processor; and an application management program (110) stored in the memory comprising machine readable instructions executable by the processor, wherein the applications management program enables or disables the application depending on at least the physical parameter data.

20 Claims, 4 Drawing Sheets

TELECOMMUNICATIONS CHIP CARD AND MOBILE TELEPHONE DEVICE

RELATED APPLICATION

This application claims the priority of European Patent Application # EP10163024.2 filed on May 17, 2010.

TECHNICAL FIELD

The invention relates to telecommunications chip cards, in particular to telecommunications chip cards which enable the login of a mobile telephone device into a digital cellular mobile telecommunications network.

BACKGROUND OF THE INVENTION

Near field radio communications are increasingly being used for contactless data exchange, i.e. for Radio Frequency Identification (RFID) tags. RFID tags may be used for granting physical access to buildings and have even been embedded in identity documents such as passports. If a key, an identity document, or a financial instrument or credit card contains an RFID tag it is important to protect the data stored in the tag from unauthorized access. This can be achieved by providing access control to the device. For example passports control access by requiring the reader to optically read data from the passport which is then used in an access protocol. Alternatively one can radio-frequency (RF) shield an RFID tag when not in use. A card with an embedded RFID tag can be stored within an electrically conductive holder to provide RF shielding. For example, the U.S. Passport card does not have access control, but is distributed with a protective shield with a printed warning which advises the document holder to keep the passport card within the holder when not in use.

Near Field Communications (NFC) devices are active devices which communicate via high frequency, low range, near field radio waves. These devices can communicate with other NFC devices and may also assume the role of an RFID tag or reader.

SUMMARY OF THE INVENTION

Since Near Field Communications devices can emulate RFID tags or readers the function of man such tags or readers can be replaced by a single Near Field Communications device. For instance a mobile telephone device equipped with a Near Field Communications interface may be used to provide such functionality. Unlike a RFID enabled card, a mobile telephone device cannot be placed in an RFID shielded container or wallet. The shielding for the RFID would also prevent the mobile telephone device from communicating with its digital cellular mobile telecommunications network. Applications which emulate the function of RFID tags could also be manually enabled or disabled by a user, however the level of security depends upon the diligence of the user. Therefore is a need for a better way of enabling or disabling applications in mobile telephone devices.

Embodiments of the invention may address this and may address other technical problems by taking several measures. First, the application to be enabled or disabled is stored in the memory of a telecommunications chip card and is executed by a processor located on the telecommunications chip card. This has several advantages. If an application is running on the processor of a mobile telephone device, the code is more accessible to hackers. Placing the application in the memory of the telecommunications chip card may make it more secure. Telecommunications chip cards are typically provided by the operators of the digital cellular mobile telecommunications network. The telecommunications chip card can be constructed such that addition or removal of an application requires the use of a cryptographic certificate, a cryptographic key, password, or cryptographic signature which only the operator of the network would have access to. Therefore applications on the telecommunications chip card can be trusted and are less susceptible to being hacked or compromised.

To enable or disable an application, embodiments of the invention use an applications management program, which is also stored in the memory of the telecommunications chip card. The applications management program uses physical parameter data to determine if an application should be activated or inactivated. Physical parameter data such as the location of the mobile telephone device or the time of day may therefore be used to control if an application is active or not.

A 'telecommunications chip card' as used herein is a chip card which enables the login of a mobile telephone device into a digital cellular mobile telecommunications network. For example a telecommunications chip card may be a subscriber identity module (SIM) which securely stores a service-subscriber key which is used to identify the subscriber on the digital cellular mobile telecommunications network.

A 'computer-readable storage medium' as used herein is any storage medium which may store instructions which are executable by a processor of a computing device. The computer-readable storage medium may be a computer-readable non-transitory storage medium. The computer-readable storage medium may also be a tangible computer readable medium. In some embodiments, a computer-readable storage medium may also be able to store data which is able to be accessed by the processor of the computing device. An example of a computer-readable storage medium include, but are not limited to: a floppy disk, a magnetic hard disk drive, a solid state hard disk, flash memory, a USB thumb drive, Random Access Memory (RAM) memory, Read Only Memory (ROM) memory, an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, DVD-R disks, or the memory of a telecommunications chip card. The term computer readable-storage medium also refers to various types of recording media capable of being accessed by the computer device via a network or communication link. For example a data may be retrieved over a modem, over the internet, or over a local area network.

A 'memory' or 'memory means' as used herein is an example of a computer-readable storage medium. Memory is computer memory which is accessible to a processor. Examples of computer memory include, but are not limited to: RAM memory, register, and register files. When installed into a suitable reader other types of computer-readable storage medium may also be considered to be memory, examples include but are not limited to: a hard disk drive, a USB thumb drive, a floppy drive, a smart card, a DVD, a CD-ROM, and a solid state hard drive.

A 'processor' as used herein is an electronic component which is able to execute a program or machine executable instruction. References to the computing device comprising 'a processor' should be interpreted as possibly containing more than one processor. The term computing device should also be interpreted to possibly refer to a collection or network of computing devices each comprising a processor. Many programs have their instructions performed by multiple processors that may be within the same computing device or which may even distributed across multiple computing device.

A 'mobile telephone device' as used herein is a mobile communication device adapted for connecting to and providing access to a digital cellular mobile telecommunications network. Examples of a mobile telephone device include, but are not limited to: a mobile telephone, a personal digital assistant, a pager, a cellular modem for a computer, a netbook computer, a notebook computer, a tablet computer, and an electronic book or document reader.

A 'chip card reader interface' as used herein is an interface located on the telecommunications chip card which is adapted for connecting the telecommunications chip card to a chip card reader.

'Near field communications' (NFC) as used herein is short range, high frequency radio communications.

A 'near field communications interface' as used herein is a communications interface which is adapted to communicate using near field communications. In some embodiments a near field communications interface is able to communicate with Radio-Frequency Identity (RFID) tags and cards and/or RFID readers. A near field communications may be able to communicate using the ISO/IEC 14443 proximity card standard. Essentially a near field communications interface may take the role of either the RFID tag or the RFID reader. A near field communications interface may also be able to communicate with another near field communications interface or reader.

The invention provides for a telecommunications chip card and a mobile telephone device in the independent claims. Embodiments are given in the dependent claims.

In one aspect the invention provides for a telecommunications chip card for enabling the login of a mobile telephone device into a digital cellular mobile telecommunications network. The telecommunications chip card comprises a chip card reader interface adapted for allowing communications between the telecommunications chip card and the mobile telephone device. The chip card reader interface is adapted for receiving physical parameter data via the chip card reader interface. Physical parameter data as used herein is data which represents the measurement of or the value of some physical parameter. Examples of physical parameter data include but are not limited to: a geographical location, time, temperature, altitude above sea level, barometric pressure, velocity, acceleration and humidity. The telecommunications chip card further comprises a processor means. The processor means may also be a processor. The telecommunications chip card further comprises a memory means for storing applications for execution by the processor. The memory means may be a memory or computer memory. The telecommunications chip card further comprises an application stored in the memory comprising machine readable instructions executable by the processor. The telecommunications chip card further comprises an application management program stored in the memory means comprising machine readable instructions executable by the processor. The instructions of the program enable or disable the application depending upon at least the physical parameter data. Essentially the physical parameter data is used to determine if an application should be enabled or disabled. This is advantageous because physical parameter data may be used to control when an application is enabled to ensure that its execution is appropriate.

In another embodiment the application comprises codes for sending and/or receiving near field communications protocol commands via the chip card reader interface. This embodiment is particularly advantageous because near field communications can be intercepted by a third party. For instance if an application is always enabled and the owner or user of the mobile telephone device is walking through a crowd third parties may be able to activate or steal data from the application by disabling the application using the physical parameter data to decide when the application is disabled provides for a higher level of security.

In another embodiment the physical parameter data comprises location data which identifies a geographical location. The application management program enables or disables the application depending on at least the geographical location. This embodiment is particularly advantageous. For instance say the application contained an access key for a door to an office building. By using the geographical location, the application which provides the near field communication key to open the door may be deactivated when not in the vicinity of the office building. This prevents the application from being accessed by a third party and enhances the security. Similarly an application which performs a payment function may be disabled when the owner or user of the mobile telephone device is in a location which is inappropriate.

If the physical parameter comprises location data or time information, it enables the "pre-"selecting of the application. For instance if the application is a Near Field Communication (NFC) application it may be pre-selected or activated using the location data. This may reduce the amount of time necessary to establish a communications link when putting the mobile telephone device within range of an NCF reader. This would enable a mobile telephone device which contains applications for emulating many NFC tags or cards to have the same performance as a dedicated or conventional single application NFC card or tag.

Pre-selecting application may also provide backward compatibility with older generation NFC readers which can only work with special proprietary single application NFC tags or cards. New NFC readers can select the application on NFC cards or tags. However, this may result in lower communication speed. This may be particularly true when many NFC applications are stored within a mobile telephone device. As the number of NFC applications is increased it may cause the NFC card reader to communicate increasingly slower.

In another embodiment the applications management program is operable for receiving a authorization message via the chip card reader interface. The authorization message is received using the over the air protocol. The application management program enables or disables the application depending on at least the authorization message. This embodiment of the invention may have the benefit that the receiving of an authorization message adds added security. For instance in this embodiment the enabling or displayed during the application may be dependent on both the authorization message and the location descriptor. For instance a cell network operator could send a message from a particular base station and all users within the particular cell service by the base station would then receive the authorization message. This could be used for example enabling certain functionality of a application at a tradeshow or exhibition. In other instances it can be used as an added measure to prevent unauthorized use of the application.

In another embodiment the applications management program is further operable for sending a authorization message request via the chip card reader interface. In this embodiment the telecommunications chip card requests the authorization message. This request is made in the form of a authorization message request. This embodiment may have the added benefit that the security is greatly increased. The telecommunications chip card runs software that is independent of the software run on the telephone or mobile telephone device. This means that the software on the communications chip card is protected from being corrupted or re-flashed in the way that a program on a mobile telephone device can. For instance the applications management program may determine that the user is in a location where a payment program can be used. To further insure that software on the can send a request to a base station requesting an authorization message request. Once the base station receives the authorization message request it then sends and authorization message. The authorization message may contain authorization to activate a application. The authorization message may also contain a cryptographic key which enables a software to be used. The authorization message may also be broadcast from a particular cell. Since the location of cell is location dependent this may be an added check to ensure that the application is only used in the vicinity where is authorized or intended to be used.

In another embodiment the memory means is adapted for storing a predetermined location. The application management program enables or disables the application depending on at least both the geographical location and the predetermined location. For instance the geographical location could be compared to see if it was in a certain distance of the predetermined location. If this is true the application could either be enabled or disabled if it was within this predetermined distance of the predetermined location. As was mentioned before, this could be useful for enabling or disabling applications which control physical access to buildings or which are used for performing a payment function.

In another embodiment the application management program extracts a location descriptor from map data using the geographical location. The location descriptor classifies the geographical location. The application management program enables or disables the application depending on at least the location descriptor. In this embodiment map data is compared to the geographical location. The location descriptor classifies or describes the geographical location. For instance a location descriptor could classify a region as being a pedestrian area; it could classify a location as being on a highway. By extracting a location descriptor the application's management program can determine in what sort of location the mobile telephone device is in. Instead of having set predetermined locations, a map can have information extracted from it and from this it can be inferred as to whether it is appropriate for an application to be enabled or disabled.

In another embodiment the location descriptor is extracted from the map data using address data, wherein the address data comprises at least one address locatable in the map data and an address descriptor descriptive of each address. This embodiment may have the advantage that address data was accessible to the telecommunications chip card can be used to determine a location descriptor from map data. In some instances map data may have a location descriptor embedded in it. For instance online maps or maps for navigation system may contain the location of various types of businesses or points of interest. However, not all maps may have location descriptors embedded in them or they may not have location descriptors of interest to the user. However many maps are constructed such that addresses may be located on them. By using address data which contains both addresses and descriptors location descriptors can be generated from the combination of the two.

In another embodiment the address data is received via the chip card interface. The address data is received using any one of the following: the over the air protocol and the Sync ML protocol. This embodiment may have the advantage that address data can be transmitted to the telecommunications chip card efficiently. For instance a network operator may wish to send a list of addresses of interest to a user. This may be formed using the over the air protocol. In other instances the sync ML protocol which is used for syncing addresses with mobile devices may also be used to send addresses. The use of the over the air protocol is particularly advantageous because the addresses can be sent to the telecommunications card securely. For instance a user may send a request for the location of ATM machines. The user may not want his payment program to be in a payment mode unless he is near one of these ATM machines. The bank could then sent a request to the telecommunications network operator to securely send the addresses via the over the air or OTA protocol.

In another embodiment the map data is stored in the memory means. This embodiment is advantageous because the map data is stored in the memory means and therefore the data and possibly location descriptors can be controlled by the company that distributes the telecommunications chip card. If the map data were for instance stored in the mobile telephone device or obtained over the internet the location descriptors or the information which is used to drive the location descriptors may not be secure for instance if the application is a payment application the telecommunications chip card could contain map data which contains locator descriptors which define where the payment application may be enabled.

In another embodiment the map data is received via the chip card reader interface. This embodiment is advantageous because dynamic map data that is changed or updated may be used to control if an application is enabled or disabled.

In another embodiment the physical parameter data comprises velocity data. The application management program enables or disables the application depending on at least the velocity data. This embodiment may be beneficial in situations where the user or operator of the mobile telephone device is moving. For instance using velocity data it could be inferred that the mobile telephone device is in a car or moving on the street. The velocity data could also be used to infer if the user or operator of the mobile telephone device is walking.

In some embodiments, the velocity data may also be combined with the extraction of a location descriptor from map data. For instance in some situations it may not be clear if the user or operator of the mobile telephone device is walking across a street or is driving. The velocity information helps to properly extract a location descriptor from the map.

In another embodiment the memory stores multiple applications. Each of the multiple applications is enabled or disabled by the application management program using at least the physical parameter data. This embodiment is advantageous because there may be a variety of applications which should be enabled or disabled. For instance there may be multiple applications for physical access to different buildings. The owner of a mobile telephone device may use the mobile telephone device for access to both an office and home locations.

In another embodiment the application management program enables or disables the applications depending on at least rules which exclude at least two of the applications from being enabled at the same time. This embodiment is advantageous because there may be situations where it is not advantageous to have two applications active at the same time. For instance if a mobile telephone device has a near field communications interface one may not wish to give access to all applications on a device that is communicating with the mobile telephone device. For instance the owner of a mobile telephone device purchased a concert ticket and the ticket was stored in the form of an encrypted certificate in the mobile telephone device. When entering the concert the mobile telephone device is used to gain admission by allowing a near field communications device to interact with the mobile telephone device. However, the near field communications device is not trusted. It may be advantageous to disable applications which grant physical access to buildings or to other payments features to avoid these from being skimmed or stolen.

In another embodiment the application is a payment application.

In another embodiment the application is an access control application. This could be physical access to a building or it may also be access control to a motor vehicle.

In another embodiment the application is an identification application. For instance a cryptographic signature or certificate could be used for identification purposes.

In another embodiment the application is a data transfer application. For instance data could be stored in the memory means or transmitted from the memory means.

In another embodiment the physical parameter data comprises time data. The application management program enables or disables the application depending on at least the time data. This embodiment is advantageous because certain times of day may be used to enable or disable applications. For instance an application which grants physical access to a building may be disabled when it is not appropriate or advantageous to grant physical access to the building. Likewise particular applications may be disabled when the user of the mobile telephone device is normally sleeping or performing some specified action.

In another embodiment the chip card reader interface is further adapted for receiving calendar data. Calendar data as used herein is any data which describes an action in conjunction with a time and/or date. The application management program enables or disables the application depending on at least the time data and the calendar data. The time data may be compared to the calendar data and may be used to infer if a certain activity should be enabled or disabled. For instance when someone is on vacation the application which grants physical access to a building may be disabled.

In another embodiment the telecommunications chip card is a subscriber identity module.

In another embodiment the telecommunications chip card is a mini-subscriber identity module.

In another embodiment the telecommunications chip card is a micro-subscriber identity module.

In another embodiment the telecommunications chip card is a universal subscriber identity module.

In another embodiment the telecommunications chip card is a CDMA subscriber identity module.

In another embodiment the telecommunications chip card is a Wilcom subscriber identity module.

In another aspect the invention provides for a mobile telephone device. The mobile telephone device comprises a telecommunications chip card according to an embodiment of the invention. The mobile telephone device further comprises a near field communications interface. The mobile telephone device further comprises a measurement system adapted for providing physical parameter data. The mobile telephone device further comprises a telecommunications chip card reader adapted for connecting to the chip card reader interface of the telecommunications chip card. The mobile telephone device further comprises a communications link for providing a communications link for exchanging data between the telecommunications chip card and the near field communication system via the telecommunications chip card reader.

The measurement system may take a variety of forms in different embodiments. For instance the measurement system may be a global positioning system (GPS). A GPS system provides location data. The measurement system may also be a system which measures time. In this case the measurement system may be a clock or comprise a clock. The measurement system may also comprise an accelerator and/or gyroscope. The measurement system may also provide measurements of environmental conditions such as the temperature and/or humidity.

In another aspect the invention provides for a digital mobile telecommunications network comprising a mobile telephone device according to an embodiment of the invention and a base station operable to connect to the mobile telephone device via a radio communications link. The mobile telephone device comprises a telecommunications chip card comprising a chip card reader interface adapted for allowing communications between the telecommunications chip card and the mobile telephone device. The chip card reader interface is adapted for receiving physical parameter data via the chip card reader interface. The telecommunications chip card further comprises a processor. The telecommunications chip card further comprises a memory for storing applications for execution by the processor. The telecommunications chip card further comprises an application stored in the memory comprising machine readable instructions executable by the processor.

The telecommunications chip card further comprises an application management program stored in the memory means comprising machine readable instructions executable by the processor. The applications management program enables or disables the application depending on at least the physical parameter data. The physical parameter data comprises location data which identifies a geographical location, The application management program enables or disables the application depending on at least the geographical location. The applications management program extracts a location descriptor from map data using the geographical location. The location descriptor classifies the geographical location. The application management program enables or disables the application depending on the location descriptor.

The mobile telephone device further comprises a near field communications interface. The mobile telephone device further comprises a measurement system (230) adapted for providing physical parameter data. The mobile telephone device further comprises a telecommunications chip card reader adapted for connecting to the chip card reader interface of the telecommunications chip card. The mobile telephone device further comprises a communications link means (104) for providing a communications link for exchanging data between the telecommunications chip and the near field communications system via the telecommunications chip card reader.

In another embodiment the base station is operable for transmitting an authorization to the mobile telephone device via the radio communication link. The mobile telephone device is operable for transmitting the authorization message to the telecommunications chip card via the chip card reader interface. The authorization message is received using the over the air protocol. The application management program enables or disables the application depending on at least the authorization message.

In another embodiment the applications management program is further operable for sending a authorization message request to the mobile telephone device via the chip card reader interface. The mobile telephone device is operable for transmitting the authorization message request to the base station via the radio communication link. The base station is operable for transmitting the authorization message to the mobile telephone device in response to the authorization message request.

BRIEF DESCRIPTION OF THE DRAWINGS

In the following preferred embodiments of the invention will be described, by way of example only, and with reference to the drawings in which.

DETAILED DESCRIPTION

Like numbered elements in these figures are either equivalent elements or perform the same function. Elements which have been discussed previously will not necessarily be discussed in later figures if the function is equivalent.

Figure 1:
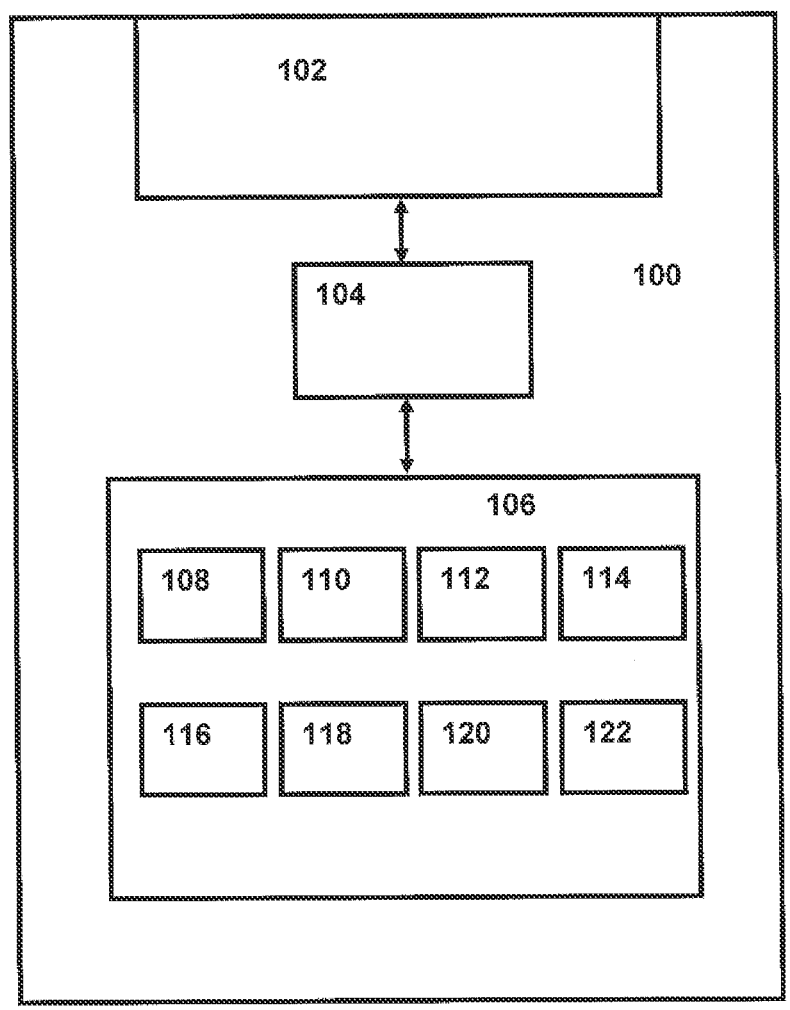
FIG. 1 shows a telecommunications chip card according to an embodiment of the invention.

FIG. 1 shows an embodiment of a telecommunications chip card 100 according to the invention. The telecommunications chip card 100 has a telecommunications chip card reader interface 102. The telecommunications chip card reader interface 102 is connected to a processor 104. The processor 104 is connected to memory 106. The memory 106 is adapted for storing data and programs or computer executable instructions which are accessible to the processor 104. The memory 106 is an example of a computer-readable storage medium.

Within memory 106 is stored an application 108. The application 108 may perform various functions such as a payment function or physical access to a building using near field communications. Also stored within the memory is an application management program 110. The application management program 110 controls if the application 108 is enabled or disabled on the basis of physical parameter data. Shown within the memory is an example of physical parameter data. Within the memory there is shown there is location data 112. Also shown within the memory 106 is data which represents a predetermined location 114. Also shown within the memory 106 is map data 116. Also shown within the memory 106 is velocity data 118. The velocity data 118 is another example of physical parameter data. Also shown within memory 106 is time data 120. The time data 120 is also an example of physical parameter data. Also shown within memory 106 is a set of rules 122. The rules 122 may be used by the application management program 110 to determine if an application 108 should be operated in conjunction with another application or not.

Figure 2:
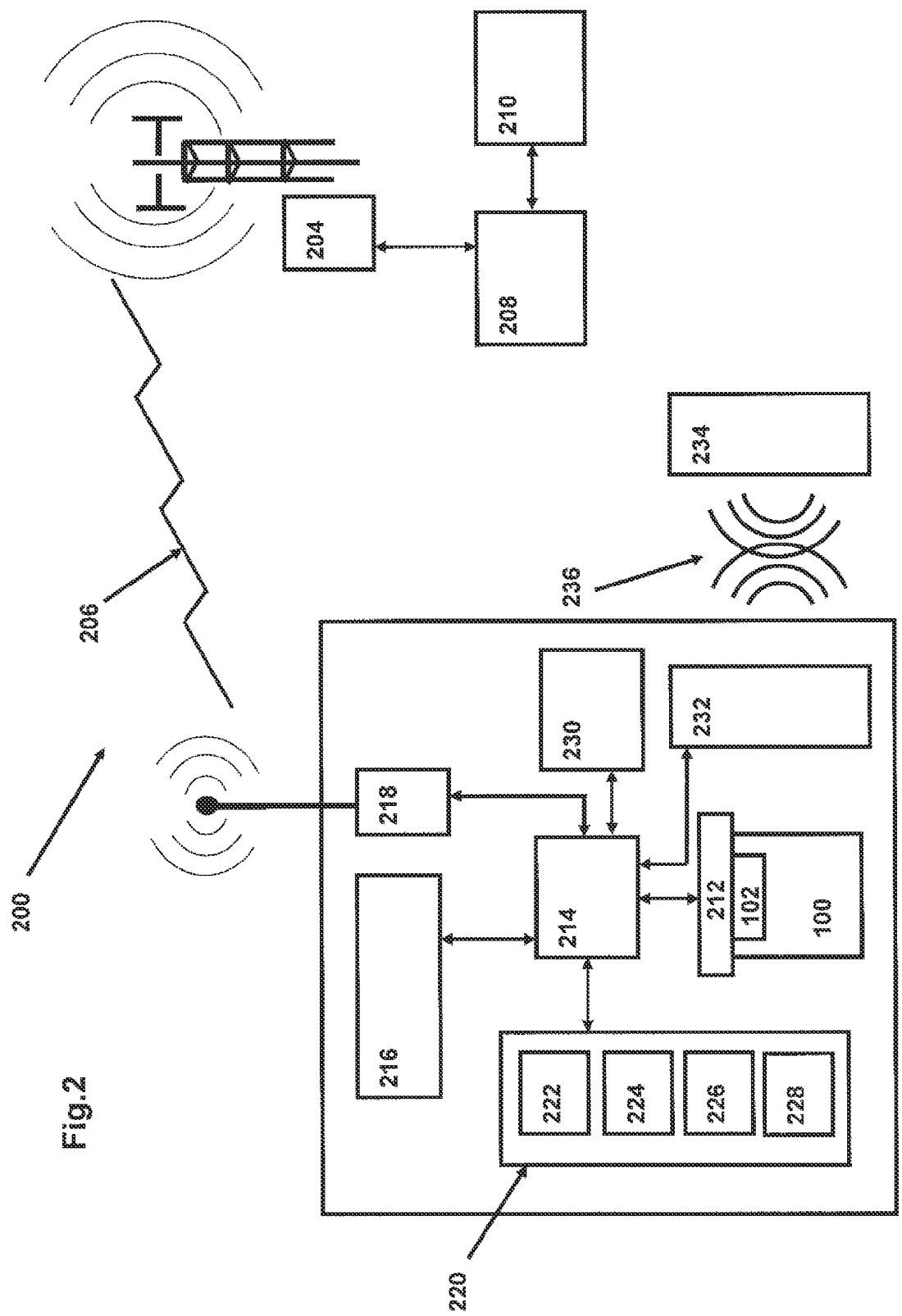
FIG. 2 shows an example of mobile telephone device according to an embodiment of the invention.

FIG. 2 shows an example of a digital cellular mobile telecommunications network 200 according to an embodiment of the invention. The digital cellular mobile telecommunications network 200 consists of a mobile telephone device 202 connected to a base station 204 via a radio communications link 206. The base station 204 is connected to a radio network controller 208. The radio network controller my provide a gateway to other communication networks such as the terrestrial telephone system, the internet, and other mobile telephone networks. As an example, the radio network controller 208 is shown as being connected further to another network 210.

The mobile telephone device 202 comprises a telecommunications chip card reader 212 which is connected to a telecommunications chip card 100 which has a telecommunications chip card reader interface 102. The telecommunications chip card reader 212 is connected to a processor 214. The processor 214 is connected to a user interface 216. The user interface 216 may comprise different components depending upon the type of mobile telephone device. For instance the user interface 216 may comprise an audio interface. This may include a microphone and a speaker with the appropriate analogue to digital and digital to analogue converters. The user interface 216 may also comprise a display for displaying information to a user. The user interface 216 may also comprise an input device for a user. For instance the user interface may comprise a touch screen and/or keypad. The processor 214 is also connected to a transceiver 218 which is used to establish the radio communications link 206 with the base station 204. The transceiver 218 may be considered to be a network communications means.

Processor 214 is further connected to a memory 220. The memory 220 stores data and instructions which are accessible by the processor 214. Within the memory 220 is shown the operating system 222 of the mobile telephone device 202. Also shown within the memory 220 is the physical parameter data 224. The memory 220 also contains a calendar application 226 which is able to generate calendar data. The memory 220 also contains map data 228. The processor 214 is also shown as being connected to a measurement system 230. The measurement system 230 is adapted for generating physical parameter data 224. As was mentioned previously the measurement system may comprise a variety of different instruments such as a global positioning system, an accelerometer, a gyroscope, an altimeter, a thermometer, a clock, or other instrument. In some embodiments the physical parameter data 224 may be obtained via the radio communications link 206. For instance the location of the mobile telephone device 202 may be determined by the digital cellular mobile telecommunications network 200.

The processor 214 is also shown as being connected to a near field communications interface 232. The near field communications interface 232 is able to communicate with a near field communications reader 234 using near field radio waves 236.

In operation the measurement system 230 acquires physical parameter data 224 which is then sent by the processor 214 to the telecommunications chip card reader 212 which is connected to the telecommunications chip card reader interface 102. As shown in FIG. 1 the application management program 110 uses the physical parameter data 224 to determine if the application 108 should be enabled or not. In this embodiment the application 108 is used for providing an application or communications over the near field communications interface 232. If the application 108 is enabled then the application 108 is able to send near field communications protocol messages via the telecommunications chip card reader interface 102 to the near field communications interface 232.

In some embodiments the telecommunications chip card 100 may generate a authorization message request. The telecommunications chip card 100 may send a request via the telecommunication chip card reader interface 102 to the processor 214 of the mobile telephone device 202. The mobile telephone device 202 may then transmit the request via the radio communications link to base station 204. The base station 204 may send the request to a server via the radio network controller 208. The radio network controller may then receives an authorization message. The base station 204 mays then send the authorization to the mobile telephone device 202 via the over the air protocol (OTA). The telecommunications chip card 100 receives the over the air protocol authorization message and is then able to use this at least partially in decide whether to enable or disable an application such as a near field communication interface 232 application.

Figure 3:
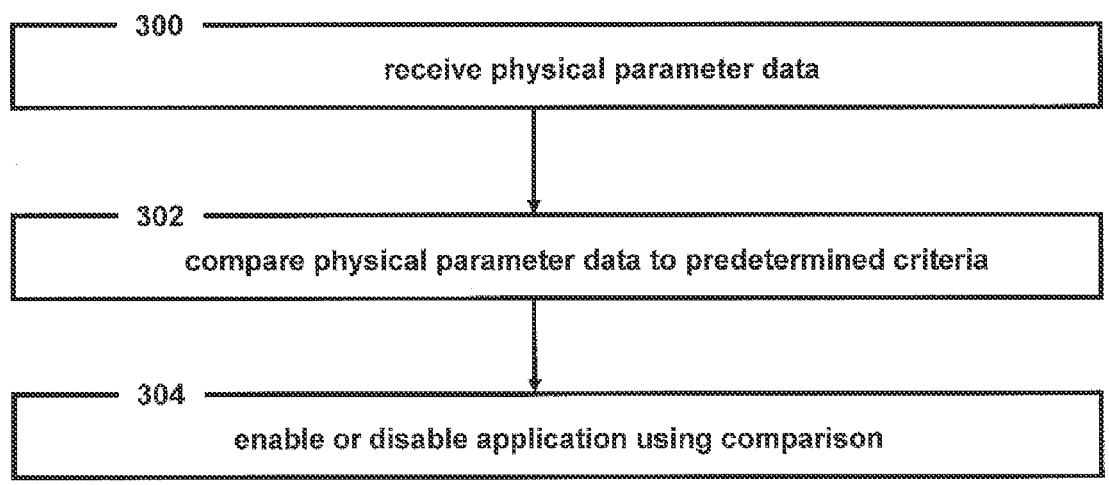
FIG. 3 shows steps in a block diagram which may be performed by the processor means when executing the application management program.

FIG. 3 shows a block diagram which illustrates one possible embodiment of the steps an application management program could perform. In step 300 the physical parameter data is received. In step 302 the physical parameter data is compared to a predetermined criterion, for instance if the physical parameter data has some value it may be checked to see if its value is within a predetermined range. If the physical parameter is a location then the physical parameter may be compared to a predetermined location to see if it was within a certain distance. Finally in step 304 the application is either enabled or disabled using the comparison that was just made between the physical parameter and the predetermined criteria.

Figure 4:
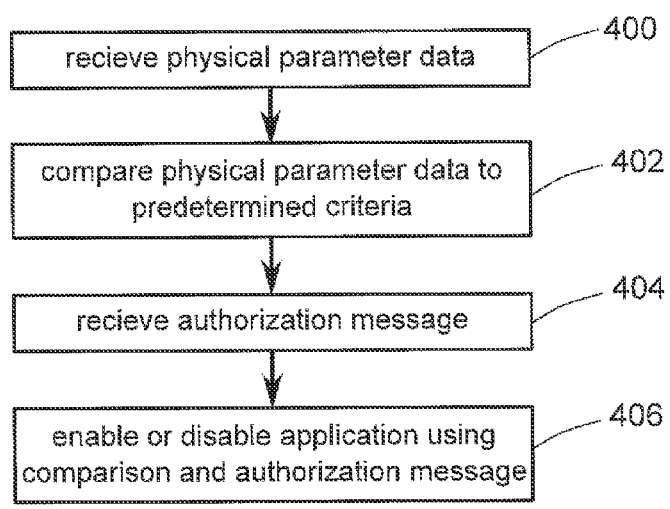
FIG. 4 shows steps in a block diagram for an alternate embodiment which may be performed by the processor means when executing the application management program.

FIG. 4 shows a block diagram, similar to FIG. 3, which illustrates another possible embodiment of the steps an application management program could perform. In step 400 the physical parameter data is received. In step 402 the physical parameter data is compared to a predetermined criterion, for instance if the physical parameter data has some value it may be checked to see if its value is within a predetermined range. If the physical parameter is a location then the physical parameter may be compared to a predetermined location to see if it was within a certain distance. In step 404, an authorization message is received via the over the air protocol (OTA). Finally in step 406 the application is either enabled or disabled using the comparison that was just made between the physical parameter and the predetermined criteria and also the authorization message.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

LIST OF REFERENCE NUMERALS 100 telecommunications chip card
102 telecommunication chip card reader interface
104 processor
106 memory
108 application
110 application management program
112 location data
114 predetermined location
116 map data
118 velocity data
120 time data
122 rules
200 digital cellular mobile telecommunications network
202 mobile telephone device
204 base station
206 radio communications link
208 radio network controller
210 other network
212 telecommunications chip card reader
214 processor
216 user interface
218 transceiver
220 memory
222 operating system
224 physical parameter data
226 calendar application
228 map data
230 measurement system
232 near field communications interface
234 near field communications reader
236 near field radio waves

The invention claimed is:

1. A telecommunications chip card for enabling the login of a mobile telephone device into a digital cellular mobile telecommunications network, the telecommunications chip card comprising:
a chip card reader interface adapted for allowing communications between the telecommunications chip card and the mobile telephone device, wherein the chip card reader interface is adapted for receiving physical parameter data via the chip card reader interface;
a processor;
a memory for storing applications for execution by the processor;
an application stored in the memory comprising machine readable instructions executable by the processor; and
an application management program stored in the memory comprising machine readable instructions executable by the processor, wherein the application management program enables or disables the application depending on at least the physical parameter data, wherein the physical parameter data comprises location data which identifies a geographical location, wherein the application management program enables or disables the application depending on at least the geographical location, wherein the application management program extracts a location descriptor from map data using the geographical location, wherein the location descriptor classifies the geographical location as a pedestrian area or a vehicle area, and wherein the application management program enables or disables the application depending on the classification.

2. The telecommunications chip card of claim 1, wherein the application comprises code for sending and/or receiving near field communications protocol commands via the chip card reader interface.

3. The telecommunications chip card of claim 1, wherein the application management program is operable for receiving a authorization message via the chip card reader interface, wherein the authorization message is received using the over the air protocol, wherein the application management program enables or disables the application depending on at least the authorization message.

4. The telecommunications chip card of claim 3, wherein the application management program is further operable for sending an authorization message request via the chip card reader interface.

5. The telecommunications chip card of claim 1, wherein the memory stores a predetermined location, wherein the application management program enables or disables the application depending on the geographical location corresponding to the predetermined location.

6. The telecommunications chip card of claim 1, wherein the location descriptor is extracted from the map data using address data, wherein the address data comprises at least one address locatable in the map data and an address descriptor descriptive of each address.

7. The telecommunications chip card of claim 6, wherein the address data is received via the chip card interface, and wherein the address data is received using any one of the following: the over the air protocol and the Sync ML protocol.

8. The telecommunications chip card of claim 1, wherein the map data is stored in the memory.

9. The telecommunications chip card of claim 1, wherein the map data is received via the chip card reader interface.

10. The telecommunications chip card of claim 1, wherein the physical parameter data comprises velocity data, and wherein the application management program enables or disables the application depending on at least the velocity data and the classification.

11. The telecommunications chip card of claim 1, wherein the memory stores multiple applications, wherein each of the multiple applications is enabled or disabled by the application management program using at least the physical parameter data.

12. The telecommunications chip card of claim 1, wherein the application management program enables or disables the application depending on at least rules which exclude at least two of the applications from being enabled at the same time.

13. The telecommunications chip card of claim 1, wherein the application is any one of the following: a payment application, an access control application, an identification application, and a data transfer application.

14. The telecommunications chip card of claim 1, wherein the physical parameter data comprises time data, and wherein the application management program enables or disables the application depending on at least the time data.

15. The telecommunications chip card of claim 1, wherein the chip card reader interface is further adapted for receiving calendar data, wherein the application management program enables or disables the application depending on at least the time data and the calendar data.

16. The telecommunications chip card of claim 1, wherein the telecommunications chip card is any one of the following: a subscriber identity module, a mini subscriber identity module, a micro subscriber identity module, a universal subscriber identity module, a CDMA subscriber identity module, and a Willcom subscriber identity module.

17. A mobile telephone device comprising: a telecommunications chip card comprising a chip card reader interface adapted for allowing communications between the telecommunications chip card and the mobile telephone device, wherein the chip card reader interface is adapted for receiving physical parameter data via the chip card reader interface, wherein the telecommunications chip card further comprises a processor, wherein the telecommunications chip card further comprises a memory for storing applications for execution by the processor, wherein the telecommunications chip card further comprises an application stored in the memory comprising machine readable instructions executable by the processor, wherein the telecommunications chip card further comprises an application management program stored in the memory comprising machine readable instructions executable by the processor, wherein the application management program enables or disables the application depending on at least the physical parameter data, wherein the physical parameter data comprises location data which identifies a geographical location, wherein application management program enables or disables the application depending on at least the geographical location, wherein the application management program extracts a location descriptor from map data using the geographical location, wherein the location descriptor classifies the geographical location as a pedestrian area or a vehicle area, wherein application management program enables or disables the application depending on the classification;
   a near field communications interface;
   a measurement system adapted for providing physical parameter data;
   a telecommunications chip card reader adapted for connecting to the chip card reader interface of the telecommunications chip card; and
   a communications link for providing a communications link for exchanging data between the telecommunications chip and the near field communications system via the telecommunications chip card reader.

18. A digital mobile telecommunications network comprising a mobile telephone device and a base station operable to connect to the mobile telephone device via a radio communications link, wherein the mobile telephone device comprises:
   a telecommunications chip card comprising a chip card reader interface adapted for allowing communications between the telecommunications chip card and the mobile telephone device, wherein the chip card reader interface is adapted for receiving physical parameter data via the chip card reader interface, wherein the telecommunications chip card further comprises a processor, wherein the telecommunications chip card further comprises a memory for storing applications for execution by the processor, wherein the telecommunications chip card further comprises an application stored in the memory comprising machine readable instructions executable by the processor, wherein the telecommunications chip card further comprises an application management program stored in the memory comprising machine readable instructions executable by the processor, wherein the application management program enables or disables the application depending on at least the physical parameter data, wherein the physical parameter data comprises location data which identifies a geographical location, wherein the application management program enables or disables the application depending on at least the geographical location, wherein the application management program extracts a location descriptor from map data using the geographical location, wherein the location descriptor classifies the geographical location as a pedestrian area or a vehicle area, wherein application management program enables or disables the application depending on the classification;
   a near field communications interface;
   a measurement system adapted for providing physical parameter data;

a telecommunications chip card reader adapted for connecting to the chip card reader interface of the telecommunications chip card; and a communications link for providing a communications link for exchanging data between the telecommunications chip and the near field communications system via the telecommunications chip card reader.

19. The digital mobile telecommunications network of claim 18, wherein the base station is operable for transmitting an authorization to the mobile telephone device via the radio communication link, wherein the mobile telephone device is operable for transmitting the authorization message to the telecommunications chip card via the chip card reader interface, wherein the authorization message is received using the over the air protocol, wherein application management program enables or disables the application depending on at least the authorization message.

20. The digital mobile telecommunications network of claim 19, wherein the application management program is further operable for sending a authorization message request to the mobile telephone device via the chip card reader interface, wherein the mobile telephone device is operable for transmitting the authorization message request to the base station via the radio communication link, wherein the base station is operable for transmitting the authorization message to the mobile telephone device in response to the authorization message request.

* * * * *